US008929226B2

(12) United States Patent
Knight

(10) Patent No.: US 8,929,226 B2
(45) Date of Patent: Jan. 6, 2015

(54) SMART ROUTING FOR VOICE OVER INTERNET PROTOCOL

(75) Inventor: Erik Knight, Phoenix, AZ (US)

(73) Assignee: Jive Communications, Inc., Orem, UT (US)

( * ) Notice: Subject to any disclaimer, the term of this patent is extended or adjusted under 35 U.S.C. 154(b) by 577 days.

(21) Appl. No.: 13/045,899

(22) Filed: Mar. 11, 2011

(65) Prior Publication Data

US 2012/0230323 A1 Sep. 13, 2012

(51) Int. Cl.
*H04L 12/66* (2006.01)
(52) U.S. Cl.
CPC ...................................... *H04L 12/66* (2013.01)
USPC .......................................... 370/248; 370/352
(58) Field of Classification Search
CPC ........... H04L 43/0811; H04L 65/1053; H04Q 2213/13384
See application file for complete search history.

(56) References Cited

U.S. PATENT DOCUMENTS

| 6,009,081 A * | 12/1999 | Wheeler et al. ............... 370/255 |
| 2002/0034179 A1 * | 3/2002 | Ollikainen et al. ........... 370/389 |
| 2002/0048283 A1 * | 4/2002 | Lin ................ 370/495 |
| 2003/0120502 A1 * | 6/2003 | Robb et al. ........................ 705/1 |
| 2005/0185587 A1 * | 8/2005 | Klinker ......................... 370/237 |
| 2005/0271029 A1 * | 12/2005 | Iffland .......................... 370/348 |

* cited by examiner

*Primary Examiner* — Asad Nawaz
*Assistant Examiner* — Jason Harley
(74) *Attorney, Agent, or Firm* — Mark V. Loen

(57) ABSTRACT

In a VoIP application where network packets must travel beyond the local internet provider, the network packet may be rerouted to avoid the open internet. The originating endpoint is provisioned to transmit network packets to the VoIP provider. The originating local internet provider receives the network packet from the originating endpoint, and transmits the network packet to the VoIP provider via a direct hand-off. The VoIP provider then transmits the network packet to the destination local internet provider via a direct hand-off. Finally, the destination local internet provider delivers the network packet to the destination end point. Transmission through the open internet is reserved as a back-up process, should transmission through the VoIP provider fail.

3 Claims, 1 Drawing Sheet

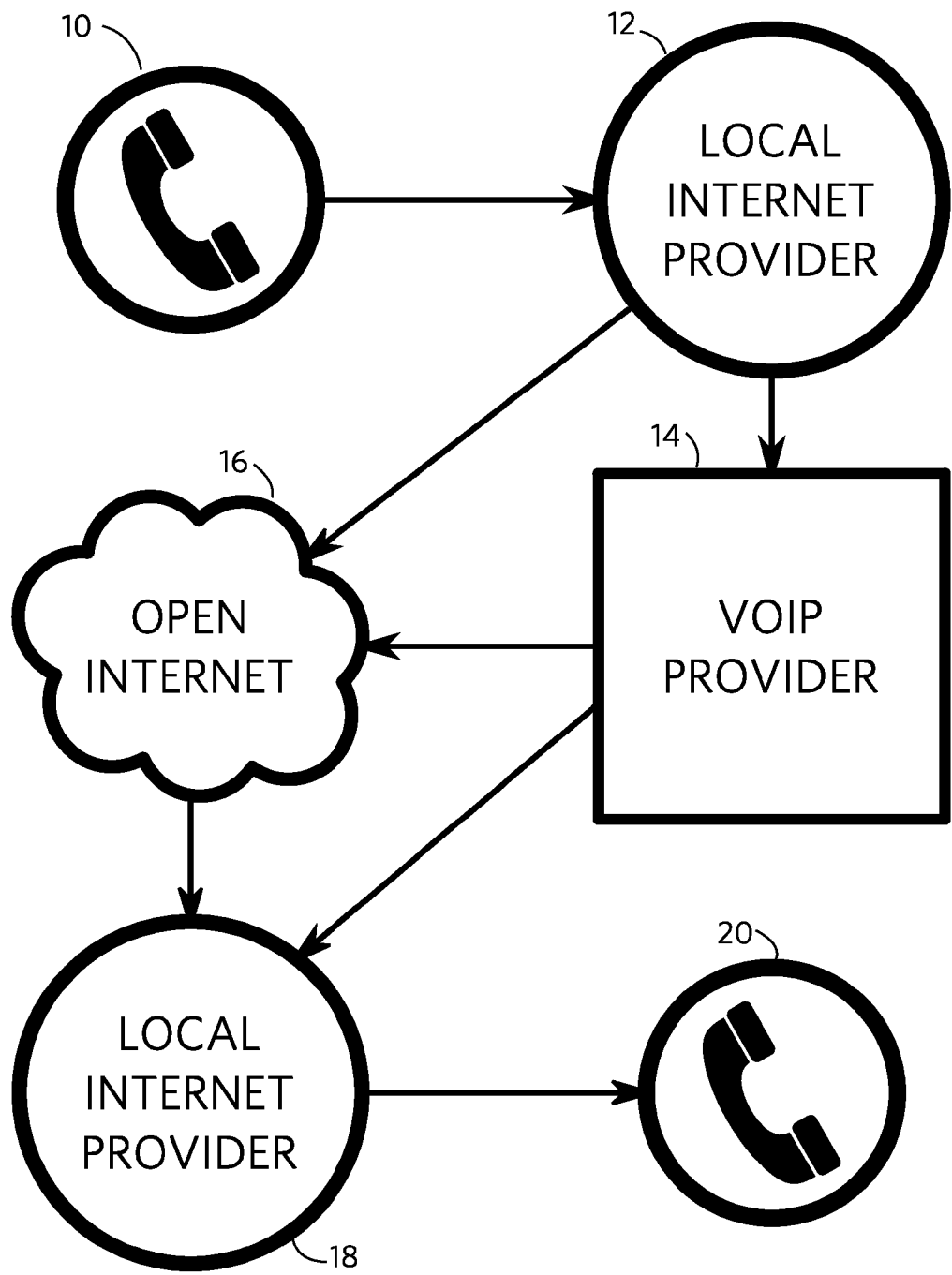

SMART ROUTING FOR VOICE OVER INTERNET PROTOCOL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates to a method for routing network packets over the internet, particularly for Voice over Internet Protocol (VoIP) applications.

2. Description of the Related Art

In modern VoIP applications, a network packet is sent from a VoIP originating endpoint to a destination endpoint. The network packet may be sent through several servers or routers during its transit to the destination endpoint.

When the originating endpoint transmits a network packet, it is first delivered to a local internet provider, or "last-mile" carrier. If the destination endpoint is not also within the local internet provider's network, the local internet provider next transmits the network packet to the open internet for delivery.

While the network packet travels through the open internet, it may pass through numerous servers and destinations, in multiple physical locations, before being delivered to the local internet provider associated with the destination endpoint. The VoIP provider has almost no control over the routing of the network packet once it has passed into the open internet. After receiving the network packet, the local internet provider delivers the network packet to the destination endpoint.

Every time the network packet is handed from one network provider or server to the next, there is a risk of loss of data integrity. The travel of the network packet through numerous servers increases the time delay of VoIP communication and reduces the quality of the voice connection between the two endpoints.

A solution is needed to address one or more of these shortcomings in the prior art.

BRIEF SUMMARY OF THE INVENTION

In a VoIP application where network packets must travel beyond the local internet provider, the network packet may be rerouted to avoid the open internet.

The VoIP originating end point is equipped with a PBX router which may be provisioned to transmit network packets to a destination other than a destination endpoint, the provisioned destination being a location such as a VoIP provider. A border router is also provided at the VoIP provider. The border router can detect which originating local internet provider the originating endpoint is connected to by conducting a reverse DNS or Whois look-up on the IP address of the originating end point, said IP address being provided by the PBX router. The border router can likewise detect which destination local internet provider the destination endpoint is connected to by conducting a reverse DNS or Whois look-up on the IP address of the destination endpoint. The border router is then provisioned to receive network packets from the originating local internet provider and transmit the network packet to the destination endpoint through the destination local internet provider.

The originating local internet provider receives the network packet from the originating endpoint, and transmits the network packet to the VoIP provider via a direct hand-off, as provisioned. The VoIP provider then transmits the network packet to the destination local internet provider via a direct hand-off. Finally, the destination local internet provider delivers the network packet to the destination end point. Transmission through the open internet is reserved as a back-up process, should transmission through the VoIP provider fail.

BRIEF DESCRIPTION OF THE SEVERAL VIEWS OF THE DRAWING

FIG. 1 depicts possible routes for a VoIP network packet.

DETAILED DESCRIPTION OF THE INVENTION

Referring to FIG. 1, in a VoIP application where network packets must travel beyond an originating local internet provider 12, the network packet may be rerouted to avoid the open internet 16.

In modern VoIP applications, network packets are typically sent from an originating endpoint 10 through an originating local internet provider 12. When a destination endpoint 20 is not on the same network as the originating local internet provider 12, the network packet must then be sent through the open internet 16. After several transmissions through the open internet 16, each of which is uncontrolled by the VoIP provider 14 and may result in a loss of data integrity, the network packet is transmitted to a destination local internet provider 18. The destination local internet provider 18 then delivers the network packet to the destination endpoint 20.

In order to maintain better data integrity for network packets, a smart routing method may be utilized to avoid transmission through the open internet 16. To facilitate this smart routing method, the VoIP provider 14 may connect to multiple local internet provider 12, 14 networks.

A VoIP originating end point 10 is equipped with a PBX router which may be provisioned to transmit network packets to a destination other than a destination endpoint 20. The provisioned destination may be a location such as a VoIP provider 14. The PBX router first sends its IP address information to a border router located at the VoIP provider 14. The border router first detects which originating local internet provider 12 the originating endpoint 10 is connected to by conducting a reverse DNS or Whois look-up on the IP address of the originating end point 10. The border router can likewise detect which destination local internet provider 18 the destination endpoint 20 is connected to by conducting a reverse DNS or Whois look-up on the IP address of the destination endpoint 20. The originating endpoint 10 is provisioned to transmit a network packet to the correct border router which is connected to the originating local internet provider 12 and VoIP provider 14.

The originating local internet provider 12 receives the network packet from the originating endpoint 10, and transmits the network packet to the VoIP provider 14 via a direct hand-off, as provisioned. The VoIP provider 14 then transmits the network packet to the destination local internet provider 18 via a direct hand-off. Finally, the destination local internet provider 18 delivers the network packet to the destination end point 20.

Multiple routes, each route having an associated priority, may be provisioned to the border router at the VoIP provider 14. This provides alternate routes, should a route with a higher priority fail due to network errors. Such routes may include transmission of a network packet from the originating endpoint 10 through the originating local internet provider 12, which provides a direct hand-off to the VoIP provider 14, which provides a direct hand-off to the destination local internet provider 18, which delivers the network packet to the destination endpoint 20. Alternatively, a route may include transmission of a network packet from the originating endpoint 10 through the originating local internet provider 12, which provides a direct hand-off to the VoIP provider 14, which transmits the network packet to the destination local internet provider 18 through the open internet 16, which delivers the network packet to the destination endpoint 20. As a fail-safe route, the network packet may also be transmitted through conventional methods, such as transmitting the packet from the originating endpoint 10 through the originating local internet provider 12, which transmits the network packet to the destination local internet provider 18 through the open internet 16, which delivers the network packet to the destination endpoint 20.

Routing and provisioning of the border router and originating endpoint 10 may be conducted through a web interface, the web interface being allowing the VoIP provider 14 to directly manage the routing process of the border router. The VoIP provider 14 may utilize this web interface to prioritize various routes based on network availability, network transmission quality, or other considerations which may affect the quality and integrity of network packet transmission.

I claim:

1. A method of routing VoIP network packets from an originating endpoint to a destination endpoint by avoiding the open internet comprising the steps of:
   (A) transmitting a plurality of said VoIP network packets from said originating endpoint by use of a PBX router,
   (B) transmitting said VoIP network packets from said PBX router to an originating local internet service provider,
   (C) transmitting said VoIP network packets from said originating local internet service provider to a border router,
   (D) sending
      1) originating IP address, and
      2) destination IP address of said VoIP network packets information to said border router by use of said PBX router,
   (E) equipping a VoIP provider with said border router,
   (F) wherein said border router:
      1) connects to a plurality of destination internet service providers, and
      2) transmits said VoIP network packets to a designated said destination internet service provider based on said destination IP address via direct hand off,
   (G) transmitting said VoIP network packets from said destination internet service provider to said destination endpoint,
   (H) provisioning:
      1) said PBX router to transmit said VoIP network packets to said VoIP provider,
      2) said border router with multiple routes,
      3) said originating local internet service provider to transmit said VoIP network packets to said border router via direct hand-off, and
      4) said border router to transmit said VoIP network packets to said destination internet service provider via direct hand-off, and,
   (I) wherein said border router additionally:
      1) detects which destination local internet provider said destination endpoint is connected to by conducting a reverse DNS or Whois look-up on the IP address of said destination endpoint, and
      2) detects which said originating local internet service provider said originating endpoint is connected to by conducting a reverse DNS or Whois look-up on an originating IP address of said originating endpoint, said originating IP address is provided by said PBX router, whereby the routing of said VoIP network packets from said originating endpoint to said destination endpoint avoids the use of the open internet.

2. The method of routing VoIP network packets according to claim 1 wherein said multiple routes comprise:
   (A) transmission of said VoIP network packets from said originating endpoint through said originating local internet service provider, which provides a direct hand-off to the VoIP provider, which provides a direct hand-off to said destination internet service provider, which delivers said VoIP network packets to said destination endpoint,
   (B) transmission of said VoIP network packets from said originating endpoint through said originating local internet service provider, which provides a direct hand-off to the VoIP provider, which transmits said VoIP network packets to said destination internet service provider through the open internet, which delivers said VoIP network packets to the destination endpoint, and
   (C) transmission of said VoIP network packets from said originating endpoint through said originating local internet service provider, which transmits said VoIP network packets to said destination internet service provider through the open internet, which delivers said VoIP network packets to said destination endpoint.

3. The method of routing VoIP network packets according to claim 1 wherein said VoIP provider:
   (A) provisions said border router,
   (B) directly manages the routing process of said border router, and
   (C) utilizes a web interface to provision and manage said border router.

* * * * *